UNITED STATES PATENT OFFICE 2,410,358

PROCESS FOR PREPARING ANTIMONY PENTAFLUORIDE

Melvin A. Perkins and Carl F. Irwin, Wilmington, Del., assignors to E. I. du Pont de Nemours & Company, Wilmington, Del., a corporation of Delaware No Drawing. Application October 7, 1943, Serial No. 505,414

3 Claims. (Cl. 23—98)

This invention relates to the preparation of antimony pentafluoride from antimony pentachloride and anhydrous hydrogen fluoride.

Ruff (Ber. 39, 4310 (1906)) described a process of preparing antimony pentafluoride wherein 0.5 mole of antimony pentachloride was added slowly to 10 moles of cold, liquid HF (a very large excess, the theory being 1 mole to 5), the mixture was kept cold (−20 to 0° C.) for several hours under a reflux condenser, then was gradually warmed to drive off evolved HCl and the excess HF. Ruff stated that the large excess of HF was necessary because antimony pentafluoride formed a complex with HF, which he believed to have the formula $SbF_5.5HF$, and which was decomposed by heating. The equations are believed to be (1) $SbCl_5 + 10HF \rightleftharpoons SbF_5.5HF + 5HCl$ (2) $SbF_5.5HF \xrightarrow{\Delta} SbF_5 + 5HF$ Ruff stated that copper apparatus could not be used because HF in the presence of copper reduced antimony pentafluoride to antimony trifluoride.

$SbF_5$ is a very strong oxidizing agent which is known to be readily reduced to the trifluoride. Even copper surfaces, which are very resistant to strong HF, are reactive enough to bring about the reduction of $SbF_5$ to $SbF_3$ in the presence of HF. Therefore, copper could not be used in the construction of reaction apparatus. Aluminum surfaces are less resistant than copper to HF, and the action of HF on aluminum is known to be too serious to allow practical use of the metal in handling that corrosive acid. It was to be expected, therefore, that aluminum would be less useful than copper for this purpose. Because iron and steel are used for storing anhydrous HF, it would be assumed that they could be used in the construction of apparatus for this reaction, but it has been found that the presence of as little as 0.02% iron in the reaction mixture causes the reaction to stop far short of completion. Under these circumstances, the prior art has been compelled to carry out the preparation of $SbF_5$ from $SbCl_5$ and HF in platinum apparatus, which is too costly for large scale manufacturing.

It is an object of this invention to prepare $SbF_5$ by a method adapted to large scale production, to prepare it cheaply and efficiently, and to improve the process of preparing it.

These objects are accomplished by the invention set forth herein which is illustrated in the following example, whose conditions are to be construed as exemplary, not as limitations. It is our surprising discovery that the reaction between $SbCl_5$ and HF to produce $SbF_5$ can be carried out on a large scale with great efficiency in aluminum apparatus.

Example 1500 parts of antimony pentachloride were charged into a suitable vessel of aluminum protected from air and moisture by a dry-air aspirator at the exit end of an aluminum reflux condenser. The condenser was cooled to and maintained at −45° C. or lower. Gaseous hydrofluoric acid (anhydrous) was bubbled into the agitated charge as fast as it was absorbed. The exit gases were absorbed in water and titrated for total acidity as well as for chloride ion. This gave the approximate rate of gas evolution and the molal ratio between HCl evolved and HF passing through unreacted. It is desirable to regulate the HF flow so that the exit gas is at least 70 mol. per cent HCl. The temperature was maintained in the range of 10–35° C. until the mass solidified and liquefied again. No attempt was made to agitate the mass during this solid stage, but agitation was resumed after the solid disappeared and was maintained during the remainder of the procedure. After agitation was resumed, the charge was very gradually heated to a temperature of 50° C. and maintained there until a total of 900 grams of HF had been admitted. The charge was stirred at the same temperature for 3 to 4 hours longer, then heated very gradually to 60–70° C. and maintained for 12 hours or until HCl evolution practically ceased.

To remove the excess HF, the mass was cooled to about 40°, the condenser allowed to warm up to 12–25° C. and the charge gradually heated, the rate being such that a steady stream of HF passed out through the condenser. The charge was heated to a maximum of 140–150° C. and maintained in that range until fuming stopped. This usually takes place in about one hour after reaching 140° C.

The crude antimony pentafluoride remaining in the vessel had close to the theoretical weight (1084 grams) and was a rather dark, viscous liquid which fumed very strongly in air. The fumes have a characteristic odor.

Simple distillation of the crude antimony pentafluoride from an aluminum retort gave an 80–90% yield of pure colorless liquid which was substantially free of chlorine and of trivalent antimony.

The excess of HF used, the rate of its addition, and the heating schedule may be widely varied, although proportions and conditions approximating those given in the example are preferred. Thus a longer period of reflux will give a higher yield of antimony pentafluoride but the increased yield is not proportionate.

The reaction temperatures may be varied from 0° to 100°, but those given in the example have practical advantages. The first stage of the reaction is carried on at 10–35° because of the tendency of antimony pentachloride to decompose at higher temperatures and because the reaction is vigorous enough without heating. As the reaction proceeds it becomes much slower and the concentration of HF increases. If this were allowed to continue, it would be hazardous when heat is applied. Since the partially fluorinated material is much more stable to heat than the antimony pentachloride, little or no decomposition occurs. The refluxing is carried on at 70° C. because it is believed that the complex ($SbF_5.5HF$) mentioned by Ruff breaks up at this temperature, releasing HF which may then react with the antimony chlorofluoride to replace the chlorine and force the reaction nearer to completion.

The method of addition of the reagents may be reversed, that is, the antimony pentachloride may be added to the HF in the cold. Care must be exercised in this method during the addition of the pentachloride to the HF, to prevent foaming, and in driving off the excess HF, for in this modified method a large excess is present and some pentafluoride may be lost by entrainment. Therefore, the procedure of the example is preferred.

This invention is an improvement over the prior art, which was limited to platinum apparatus. The excellent results obtained are highly surprising because of the theoretically unsatisfactory characteristics of aluminum. A particular advantage is that the reaction proceeds farther toward completion than in iron equipment when a similar technique is used. In iron equipment the reaction stops when a product containing about 20% fluorine is obtained. Antimony pentafluoride obtained from our process analyzed 43.8% fluorine. A still further advantage is that the preferred process is less hazardous than the prior art, in which severe foaming occurred from the rapid evolution of HCl. More antimony pentafluoride can be prepared in any given size apparatus in a shorter period of time than by methods of the prior art. For example, to produce 1100 g. of the product by the process of the example would require 3.3 charges by the old method, would require double the amount of HF, and almost fifty hours more time. It is, therefore, apparent that the new process has great advantages over the prior art.

As many apparently widely different embodiments of this invention may be made without departing from the spirit and scope thereof, it is to be understood that we do not limit ourselves to the specific embodiments thereof except as defined in the appended claims.

We claim:

1. The process of preparing $SbF_5$ which comprises reacting $SbCl_5$ with HF in an aluminum vessel having an aluminum reflux condenser, the HF being admitted with agitation at about room temperature to the $SbCl_5$, raising the temperature of the reaction mass as the reaction lags, refluxing at about 70° C., cooling the bath to about 40–45° C., removing excess HF, and isolating the $SbF_5$ by distillation in aluminum apparatus.

2. The process which comprises reacting $SbCl_5$ with HF to produce $SbF_5$ in an aluminum apparatus.

3. The process of preparing $SbF_5$ from $SbCl_5$ and anhydrous HF which comprises adding the HF little by little to the $SbCl_5$, and progressively increasing the temperature; the reaction being carried out in aluminum apparatus.

MELVIN A. PERKINS.
CARL F. IRWIN.